United States Patent [19]
Stringer

[11] Patent Number: 5,819,881
[45] Date of Patent: Oct. 13, 1998

[54] DUAL LOCKING LINEAR MECHANICAL LOCK FOR HIGH LOADS

[75] Inventor: Calvin R. Stringer, Saugus, Calif.

[73] Assignee: P. L. Porter Co., Woodland Hills, Calif.

[21] Appl. No.: 506,085

[22] Filed: Jul. 24, 1995

[51] Int. Cl.⁶ .................................................. B65H 59/10
[52] U.S. Cl. ........................................ 188/67; 188/77 W
[58] Field of Search .................................. 188/67, 77 W, 188/265; 297/375; 303/89

[56] References Cited

U.S. PATENT DOCUMENTS

| | | | |
|---|---|---|---|
| 2,750,994 | 6/1956 | Howell, Jr. | 188/67 X |
| 3,941,141 | 3/1976 | Robert | 188/67 X |
| 4,411,339 | 10/1983 | Porter | 188/67 |
| 4,425,987 | 1/1984 | Porter | 188/67 |
| 4,457,406 | 7/1984 | Porter | 188/67 |
| 4,577,730 | 3/1986 | Porter | 188/67 |
| 4,634,182 | 1/1987 | Tanaka | 297/379 |
| 4,685,736 | 8/1987 | Tanaka et al. | 297/366 |
| 4,880,084 | 11/1989 | Tanaka et al. | 188/67 |
| 5,150,771 | 9/1992 | Porter | 188/67 |
| 5,157,826 | 10/1992 | Porter et al. | 29/439 |
| 5,219,045 | 6/1993 | Porter et al. | 188/67 |

FOREIGN PATENT DOCUMENTS 1477908  3/1967  France ..................................... 188/67

*Primary Examiner*—Peter M. Poon
*Attorney, Agent, or Firm*—Oppenheimer Wolff & Donnelly LLP

[57] ABSTRACT

A linear mechanical lock comprises an elongated housing. A rod having a first end inserted into the housing and a second end extending out of the housing. A first lock comprising a locking spring having an end fixed in the housing and extending around a portion of the rod. The normal inside diameter of the locking spring is less than the rod's outside diameter so that the spring grips the rod. A moveable handle engages the locking spring, and movement of the handle uncoils the locking spring to release the rod. A second lock comprises a collet having at least one jaw around the rod within the housing. The jaw normally is out of the engagement with the rod. The collet has a first region having an inside diameter around the normal position of the jaw to provide sufficient room for the jaw to be out of engagement with the rod. The collet has a second region adjacent to the first region with an inside diameter having insufficient clearance to provide sufficient room for the jaw to be out of engagement with the rod. A bushing in the housing has an end adjacent to the jaw for pushing the jaw into the second region to force the jaw against the rod.

38 Claims, 3 Drawing Sheets

DUAL LOCKING LINEAR MECHANICAL LOCK FOR HIGH LOADS

BACKGROUND OF THE INVENTION

1. Field of the Invention

The present invention relates to mechanical locks in which a rod translates axially within a housing. A coil spring normally grips the rod until the spring is uncoiled slightly.

2. State of the Art

Known mechanical locks allow parts to move relative to each other and to lock them together when necessary. Adjustable automotive seats are a common system using mechanical locks. Typically, one or more mechanical locks control elevation and tilt angle of the seat, and also lock the seat on horizontal rails so that the seat can be positioned at preferred distances from a steering wheel or an accelerator or brake pedal. Porter and Sember, U.S. Pat. No. 3,874,480 (1975), "Friction Brake Mechanism" and Porter, U.S. Pat. No. 4,577,730 (1986), "Mechanical Lock," are two examples of such locks.

Both locks rely on a rod that can move longitudinally within a housing. The housing or rod attaches to a fixed vehicle part, and the other attaches to a part that can move. A coil spring, which is fixed relative to the housing, has a normal inside diameter slightly less than the rod's outside diameter. When a release lever acts on the coil spring's free end, the spring unwinds or uncoils slightly. Unwinding increases the spring's inside diameter enough to release the rod.

If the rod is subject to bi-directional loading, these locks use two springs, one on each side of a common release lever. Two end bushings contain the spring axially. One end tang of each spring is fixed to its bushing, and the inner spring coil ends connect to a release lever. Lever movement simultaneously unwinds both springs to release the rod.

An axial bore through each bushing supports the rod and permits it to slide through the lock housing. The bushing also may have an axial bearing surface or an angled surface. Porter, U.S. Pat. No. 4,456,406 (1984), "Improved Friction Lock," is an example. When the rod is loaded axially, the rod pulls the coil spring against the axial bearing or angled surface. This action cants the end coils of the spring, which deforms the coils, thus increasing the coil's friction force on the rod.

Although these locks have proved to be very useful, they are limited to axial loads of 3,000–4,000 lbs. (1,360–1,800 kg). A higher load either destroys the springs, or they apply insufficient force to stop rod movement.

Products other than coil spring mechanical locks, such as electric ball screw actuators and spinning nut mechanical systems, also are available. The spinning nut is on an Acme threaded rod, which has a high helix thread. Load on the rod causes the nut to rotate, but a latch system on the nut stops the rotation. Alternatively, the Acme screw rotates while the nut is held stationary. These systems are very expensive and quite heavy. Weight is particularly a problem in airplane seats, but automobile manufacturers also look to decrease weight. However, one must not sacrifice load carrying abilities merely to decrease the weight.

There is a trend in the automobile industry to fasten seat belts at the top of a vehicle seat. Loads during crashes at the top of the seat create very high loads on the mechanical lock that holds the seat back upright. Seat designers anticipate loads as high as 20,000 lbs. (9,000 kg) in such systems, but present devices are not made to withstand those loads.

SUMMARY OF THE INVENTION:

The principal objects of the present invention are to disclose and provide a mechanical lock that can withstand loads well in excess of 4,000 lbs., to the 20,000 lb. range. Another object is to disclose and provide such a lock that is relatively inexpensive and light weight.

Another object of the present invention is to disclose and provide a lock that has the function of a standard coil-spring mechanical lock, resisting loads under 4,000 lbs. repeatedly, without adverse effects on the lock. If, however, the lock is subject to a much higher load, up to 20,000 lbs., a second locking mechanism secures the rod within the housing. Although there may be permanent effects on the mechanical lock on such high loads, the lock once will provide sufficient resistance to higher loads to protect drivers or passengers.

The linear mechanical lock of the present invention comprises an elongated housing which attaches to a fixed part of an automobile. A first end of a rod extends into the housing. The rod's second end extends out of the housing and is attached to an automobile part that is locked and unlocked such as a seat back. The present invention has two, cooperating locking systems. The first lock comprises a locking spring or a pair of such springs. One spring end is fixed in the housing, and the other spring end attaches to a handle. The spring's coils encircle the rod. Because the normal inside diameter of the locking spring is less than the rod's outside diameter, the spring grips the rod. When the handle is moved, it uncoils the locking spring, which increases its inside diameter enough to release the rod.

A pair of bushings at the end of the spring support the spring. Each bushing also has an axial bore that supports the rod and permits it to slide through the housing. Depending on the amount of force applied to the rod, the coil spring prevents rod movement. As force increases, the rod begins pulling the coil spring against the bushing.

The invention's second lock comprises a collet having at least one jaw around the rod within the housing. The collet has an inside diameter around the jaw so that the jaw does not engage with the rod. The collet also has a second region adjacent to the first region in which the inside diameter is insufficient for clearance between the jaw and the rod.

When a force strong enough to overcome the spring's grip acts on the rod, the spring moves with the rod and begins pushing on one of the bushings. As that bushing moves, it pushes the jaw toward the second region. The inside wall of the collet at the second region urges the jaw against the rod, and the jaw teeth are forced to bite into the rod and hold it fast.

A spring or resiliency in the jaw urges the jaws away from the rod so that the jaws normally do not interfere with the rod. A soft metal fuse also holds the jaw in the first, larger-diameter region of the collet. The fuse is easily crushed when large forces move the jaw to the second, narrow-diameter region.

BRIEF DESCRIPTION OF THE DRAWINGS

FIGS. 3, 4 and 5 are, respectively, sectional views taken through sections 3—3, 4—4, and 5—5 of FIG. 2.

FIG. 6 is a side view, partially in section, of a second embodiment of the dual locking linear mechanical lock of the present invention.

DETAILED DESCRIPTION OF THE PREFERRED EMBODIMENTS

Figure 1:
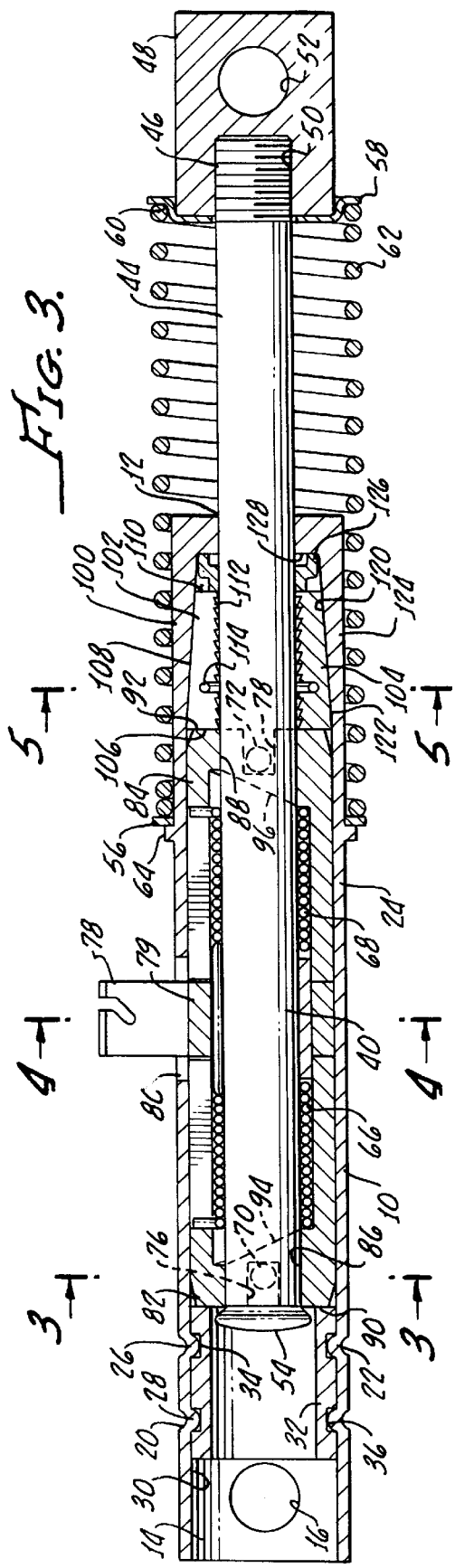
FIG. 1 is a side elevation, partially cutaway showing the dual locking linear mechanical lock of the present invention mounted on a vehicle seat.

FIG. 1 shows an embodiment of the dual locking linear mechanical lock 2 of the present invention mounted near the base of a vehicle seat 4. The lock of the present invention may control many positions of a vehicle seat. FIG. 1 shows it locking the seat back 6 through a connection 8 from the seat back. When the mechanical lock is in its locked condition, the seat back cannot pivot, but when the mechanical lock is unlocked, the driver or passenger can pivot the seat back.

Figure 2:
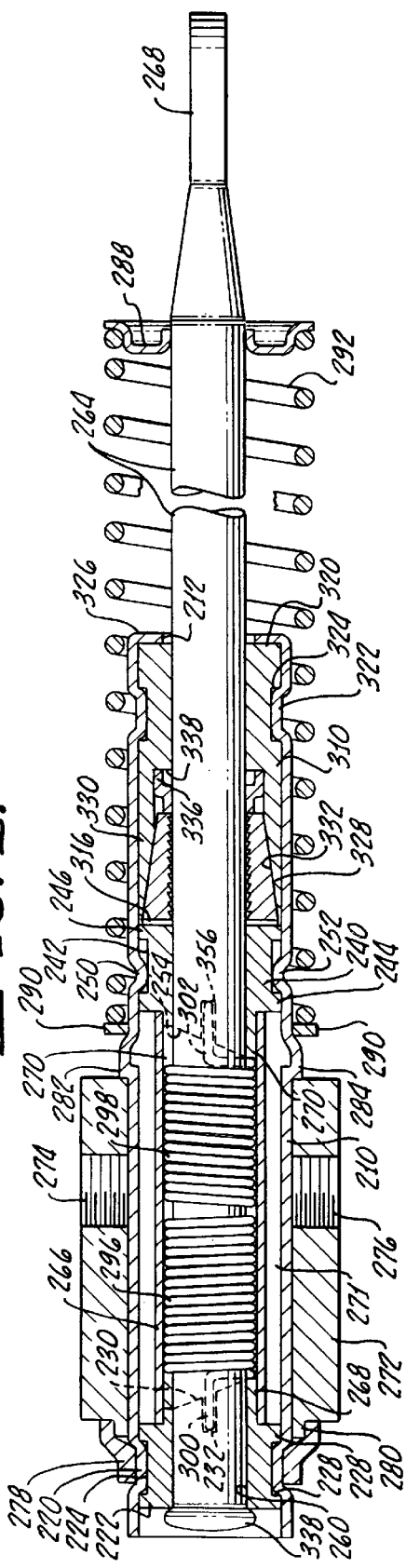
FIG. 2 is a side sectional view of one embodiment of the dual locking linear mechanical lock of the present invention.

In the FIG. 2 exemplary embodiment, the dual locking linear mechanical lock of the present invention has a cylindrical, elongated housing 10. The housing is strong material, typically a low-carbon steel. For automobile, truck and airplane seating, the most common application for the mechanical lock of the present invention, low-carbon steel's lack of corrosion resistance should not cause problems. Applications that are exposed to water may warrant a more corrosion-resistant material such as stainless steel.

The parts' sizes will vary with the application. Housing 10 in the FIG. 2 embodiment is a cold drawn tubing. The OD is 1.125" (28.6 mm) and the wall thickness is 0.083" (2.1 mm) (metric conversions are rounded and approximate). Using a low carbon steel tubing, housing 10 will have 70,000 psi (4,900 kg/cm$^2$) tensile strength. One could also incorporate the teachings of Porter and Babiciuc, U.S. Pat. No. 5,157,826 (1992), "Method for Making Linear Mechanical Lock with One-Piece Lock Housing," for constructing the present invention's housing. Similarly, the housing is cylindrical, because that shape is strong, easily formed and easy to work with. Other shapes also are possible.

Housing 10 has an open end 12 (FIG. 2). A mounting attachment 14 is welded or otherwise fixed at the closed or other end of the housing. The mounting attachment has a bore 16 through which a bolt (not shown) extends to secure housing 10 to part of the seat or to a fixed part of the vehicle. Throughout the description, the exemplary embodiments' housings are said to be attached to a fixed point on a vehicle and a rod that moves into and out of each housing has an attachment fitting that is said to be attached to a moveable vehicle part. Those functions can be reversed.

The housing in the first exemplary embodiment also has a pair of circumferential grooves 20, 22 (FIG. 2). The grooves may be continuous, interrupted or spaced ball swages. When the manufacturing process forms the grooves in the outer surface 24 of the housing, rounded ridges 26 and 28 form on the housing's inside surface 30. The ridges intersect corresponding grooves 34 and 36 on the outside of cylindrical metal sleeve 32.

The mechanical lock of the present invention also includes a rod having a first end inserted into the housing and a second end extending out of the housing. In the exemplary embodiment, rod 40 is steel, 0.500" (12.70 mm) outside diameter. As FIG. 2 shows, the first or inside end 42 of the rod is within housing 10, and the second or outside end 44 extends outside the housing. The second or outside end of the rod has a threaded end 46 that mates with threaded bore 50 on attachment fitting 48. The attachment fitting may take many forms. For example, although shown as a separate part, it could be an integral part of the rod. Instead of being solid, it could be a U-shaped member with the web between two upright walls attached to the rod. A bolt (not shown) through hole 52 (FIG. 2) through attachment fitting 48 secures the outside end of the rod to part of a seat.

A ring 56 extends radially outward from the outside surface 24 of housing 10 (FIG. 2). Similarly, a ring 58 attaches to attachment fitting 48. The shape (see FIG. 2) of ring 58 creates a ledge at its shoulder 60. Arcuate members, which do not extend completely around the housing or attachment fitting, may replace either ring. The two rings 56 and 58 form opposing ledges. A helical bias spring 62 (FIG. 2) attaches to the two rings 56 and 58 and spans the distance between the rings. The bias spring is normally in compression to urge rod 40 outward (i.e., to the right relative to the housing in FIG. 2). The length, diameter, spring constant and other properties of the helical spring depend on the application. The housing may have push-outs 64 (FIG. 2) to secure ring 56 against movement to the left.

Rod 40 also has a knob or wider diameter region 54 (left end of FIG. 2). Also, although FIG. 2 does not show it, mounting attachment 14 is positioned such that it does not interfere with movement of the rod 40.

The mechanical lock of the present invention includes a locking spring. The spring has an end fixed in the housing and extends around a portion of the rod. The FIG. 2 exemplary embodiment uses two springs 66 and 68, coiled opposite to each other. The normal inside diameter of both locking springs is such that the springs grip the rod, but when the locking springs are uncoiled, they release the rod. In FIG. 2, the two locking springs 66 and 68 surround portions of rod 40. Each spring has a first end tang 70 and 72. Each tang seats in a corresponding notch 74 and 76 in bushings 82 and 84. (See also FIG. 4). An extension (not shown) from each spring's other end attaches to a fitting (also not shown) on handle 78, which extends outward from annular ring 79 about rod 40. (FIGS. 2 and 5). The handle extends through an opening 80 in housing 10.

Porter and Babiciuc, U.S. Pat. No. 5,219,045 (1993), "Linear Mechanical Lock with One-Piece Lock Housing," and the previously-mentioned U.S. Pat. No. 5,157,826 describe in detail how a locking spring interacts with a rod in a mechanical lock to secure or release the rod. The patents' disclosures are incorporated by reference. Briefly, each locking spring 66, 68 is a tightly wound coil of 0.062" (1.57 mm) OD music wire. In the exemplary embodiment, the locking spring has 16½ turns. When not around rod 40, the coil's ID is about 0.486" (12.34 mm). Therefore, when the locking spring is around the 0.5" (12.7 mm) rod, the spring grips the rod tightly.

Housing 10 mounts metal bushings 82 and 84. The bushings have central axially aligned bores 86 and 88 through which rod 40 passes (FIG. 2). Typically, each bore's inside diameter is slightly greater than the rod's outside diameter. If the rod's OD is 0.500" (12.70 mm), the bores' ID will be 0.510" (12.96 mm). In the FIG. 2 embodiment, the bushings are press-fit into the housing. Metal sleeve 32 positions the left bushing 82, and handle ring 79 acts as a spacer between the bushings. Other embodiments, which are described below, hold the bushings by pinching the housing around the bushings. Other methods, such as welds, fasteners or adhesives also may be possible depending on the materials and the environment.

The inside diameter of sleeve 32 is greater than the bushings' inside diameter. In FIG. 2, the sleeve's ID can accommodate knob 54 of rod 40.

Each outer face 90 and 92 of bushing 82 and 84 is perpendicular to the longitudinal axis of the rod and housing (FIG. 2). On the other hand, the bushings' inner faces 94 and 96 are at a preferred 65° angle to that axis. Coil springs 66 and 68 interact with the angled bushing faces in a manner discussed below. See also the previously mentioned U.S. Pat. No. 4,456,406, which describes in some detail a coil spring in contact with an angled cam surface of a bushing. Its description is incorporated by reference.

A user can activate handle 78: (a) directly, by pushing or pulling on a part of the handle within a user's reach; or (b) indirectly through a remote activator. In an example of the direct mode, part of the handle projects from the side of an automobile seat within reach of a driver's or passenger's seat. See FIG. 1. Also, see previously-mentioned U.S. Pat. No. 4,456,406, which shows a handle that may extend outside a seat. When a user activates handle 78, the handle acts on the spring's extensions of coil springs 66 and 68 to unwind or uncoil the springs slightly. Each spring uncoils instead of rotating because spring tangs 70 and 72 are fixed in their respective notches 74 and 76. The uncoiling action increases each spring's inside diameter enough to release rod 40. The rod, therefore, can translate into and out of open end 12 of housing 10.

In normal operation, handle 78 is in its normal position. Therefore, the coil springs 66 and 68 are not uncoiled and grip rod 40. If one applies a relatively small axial load to the rod, for example, a load transmitted from a car seat during a sudden stop, springs 66 and 68 continue gripping the rod. Therefore, the rod does not move longitudinally.

As the load on rod 40 increases, one of the coil springs 66 or 68 pushes against its bushing 82 or 84 with increased force. Because of the angle of bushing faces 94 or 96, the coils become canted to the rod, which changes the normally circular coils to ellipsoids. This increases the force that the coil applies to the rod so the coil spring grips the rod more tightly. When the load from the rod is released, the coil spring returns to its circular shape.

At axial loads on rod 40 of more than 4,000 lbs. (1,800 kg), the rod can overcome the forces from the coil spring 66 or 68. To provide additional locking force, the mechanical lock of the present invention also includes a second lock that cooperates with the coil spring lock. That second lock comprises a collet having at least one jaw around the rod within the collet. The FIG. 2 exemplary embodiment shows a collet 100 portion formed as part of the right side of the housing. In this embodiment, the collet receives three jaw members 102, 103 and 104 (FIGS. 2 and 6). The three jaw members are identical or nearly so. Each jaw has a rear face 106 (only jaw 102 shows reference numerals for its faces), a top or outer face 108, a front face 110 and a bottom or inner face with teeth or serrations 112 that can engage rod 40. The rear face 106 of jaw 102 normally rests against outer face 92 of bushing 84.

A jaw engaging spring extends between at least two jaw members and is biased to urge the jaw members away from the rod. In the exemplary embodiment, the jaw engaging spring comprises an expansion ring 114 in compression, (FIGS. 2 and 6). The ring is formed from resilient material such as spring wire and seats in a groove or notch 116 in jaw members 102, 103 and 104. Each groove or notch is aligned with a corresponding groove or notch on the other jaw members. The ring urges the jaw members outward and out of contact with rod 40. The FIG. 2 and 6 position is the jaw's normal orientation, out of engagement with the rod.

Collet 100 has a first region having an inside diameter around the normal position of the jaw to provide sufficient room for the jaw to be out of engagement with the rod. The collet also has a second region adjacent to the first region that has an inside diameter with insufficient clearance to provide sufficient room for the jaw to be out of engagement with the rod. In the exemplary embodiment the jaw's outer face 108 slopes. That is, each jaw members' outside diameter near rear face 106 is greater than the outside diameter near the front face 110. Similarly, the right side of collet 100 has a narrowing inside diameter at 120.

In the FIG. 2 exemplary embodiment, jaw members 102, 103 and 104 are shown in the first region 122 of the collet portion 100 of housing 10. That region is close to the outside bushing 84. A compression ring 126 of soft metal, such as aluminum, seats in the housing between the inside wall 128 of the open end 12 of housing 10 and the front wall 110 of jaw 102. The compression ring normally holds the jaws in the first region 122 (i.e., to the left side of collet 100), out of contact with rod 40.

If a sufficient force is applied on rod 40 such that spring 68 moves with the rod, the spring pushes on bushing 84. Bushing movement in turn moves jaw members 102, 103 and 104 to the right (FIG. 2). The jaws then move toward second region 124 of the collet 100 (FIG. 2) as outer face 108 of jaw member 102 slides along the narrowing surface 120. This movement of the jaw to the right (FIG. 2) collapses compression ring 126. The decreasing collet diameter causes the jaw members to move inward, against expansion ring 114 until the jaw members grip the outside of rod 40. As the force on the rod continues pulling the rod to the right (FIG. 2), the collet portion of housing forces the jaw members, which are sandwiched between the collet and the rod, stop further movement of the rod.

If spring 68 does not impart sufficient force on bushing 84 to move jaw members 102, 103 and 104 to engage rod 40, eventually, the knob 54 on the left end of the rod reaches bushing 82. Because the knot is too large to pass through the bushing's bore 86, movement of the rod to the right (FIG. 2) will pull bushing 82 in the same direction. Bushing 82 then pushes handle ring 79, which, in turn pushes bushing 84 in the same direction to move the jaw to the right.

Compression ring 126 can be considered a mechanical fuse. That is, it normally holds jaw members 102, 103 and 104 to the left (FIG. 2) so that the jaws do not engage the rod until the lock of the present invention is subjected to very high loads. Sufficient force from jaw movement to the right collapses compression ring 126, and its metal will be permanently deformed. Note that the compression ring is shaped such that it can collapse in the space in front of the jaws without interfering with the jaw.

Turning next to the exemplary embodiment that FIG. 6 shows, housing 132 is a cylindrical tube. As with the first embodiment, the housing has a 1.125" (28.6 mm) outside diameter. The wall thickness is 0.083" (2.11 mm). Cold drawn, low carbon steel, which has a 70,000 psi (4,900 kg/cm$^2$) tensile strength is the preferred material for the housing.

In the first exemplary embodiment (FIG. 2), sleeve 32 establishes the inside, left reference in housing 10 for the internal parts. Similarly, in the FIG. 6 embodiment, sleeve 134 establishes the inside, left reference in housing 132. The sleeve has a wide groove 136 into which circumferential indentation 138 of the housing seats. Two semi-circular split rings 140 and 142 form a keeper ring around indentation 138. Finally, metal crimp sleeve 144 secures the keeper ring and the housing indentation in groove 136 to hold sleeve 134 in place in the housing.

The housing's outside (right in FIG. 6) end 146 receives a cone sleeve 148 (FIG. 6). The cone sleeve has a bore 150 through which rod 152 translates. Housing 132 secures the left side sleeve 134 and cone sleeve 148 similarly. That is, groove 154 at the end of the cone sleeve receives an indentation 156 at the right end of the housing. Two semi-circular split rings 158 and 160 form a keeper ring around the indentation, and metal crimp sleeve 162 secures the keeper ring and the indentation in groove 154. The end of the housing is flared outward at 164 to secure the structure that holds the cone sleeve to the housing.

If desired, flare 165 may be bent to seat the left end of helical bias spring 166. Alternatively, and as FIG. 6 shows, the left end of bias spring 166 seats against ring 168 around housing 132. Notches or push-outs 170 secure the ring to the housing. The right end of the bias spring seats in ring 172, which is attached to fitting 174 on the end of rod 152. The helical bias spring is normally in compression urging rod 152 outward. The remaining internal parts are the same as those in the FIG. 2 embodiment and are not shown in FIG. 6.

Figure 7:
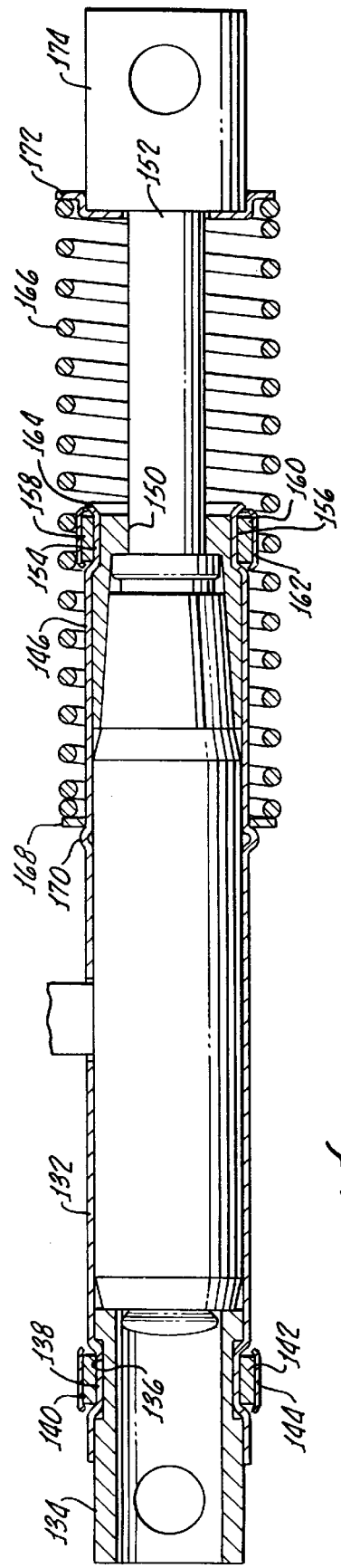
FIG. 7 is a side sectional view of a third embodiment of the dual locking linear mechanical lock of the present invention.

In the FIG. 7 exemplary embodiment, the dual locking linear mechanical lock of the present invention has a cylindrical, elongated steel housing 210. The nominal OD of housing 210 is 1.125" (28.6 mm) and the wall thickness is 0.083" (2.1 mm). The housing has an open end 212 at the right side (FIG. 3) of the housing.

The housing in this exemplary embodiment has a rear circumferential groove 220 (FIG. 7). The groove seats in annular groove 224 between two annular ridges 226 and 228 of rear bushing 222. The manufacturing process forms groove 220 while bushing 222 is in place within housing 210. Therefore, the housing groove 220 seats within bushing groove 224 to secure the bushing longitudinally. Rear bushing 222 has an angled forward facing surface 230, which has a preferred 65° angle. Bushing 222 also has a notch 232 for receiving part of the coiled locking spring as described below.

Similarly, forward bushing 240 (FIG. 7) is identical to rear bushing 220. That is, the bushing has an annular groove 242 between annular ridges 244 and 246. The present invention includes a bushing locating ring fixed in the housing adjacent the second bushing for fixing the longitudinal position of the second bushing in the housing. Although bushing 240 could be held in place by forming an annular groove inward from the outside of the housing about the bushing's annular groove, the bushing locating ring of the preferred embodiment uses two ⅛" (3.2 mm) ball swages 250 and 252 which are 180° apart. Bushing 240 also has an angled face 254 (FIG. 7) and a notch 256.

Bores 260 and 262 in respective bushings 222 and 240 support rod 264 for longitudinal movement. In the exemplary embodiment, the outside diameter of rod 264 is 0.500" (12.7 mm). The bushing bores' 0.510" (12.95 mm) ID provides clearance for rod 264.

Ring 266, which is attached to a activation handle (not shown), extends between bushings 222. Ring 266 rests on annular shoulders 268 and 270 of the respective bushing (FIG. 7).

An aluminum trunnion ring 272 surrounds part of housing 210 (FIG. 7). The trunnion ring has two threaded openings 274 and 276 that receive trunnions (not shown). The trunnions provide structure for attaching the housing to a point on a vehicle. Retainer ring 278, which seats in rear circumferential groove 220, extend to rear-facing shoulder 280 of the trunnion ring The retainer ring holds the left side of the trunnion ring longitudinally on the housing. Three push-outs (only two, 282 and 284, are shown in FIG. 7), located 120° apart hold the right side of the trunnion ring on the housing. The discussion of FIG. 8 below contains a more detailed description of the trunnion.

The outer end of rod 264 tapers, and is flattened at 286. The flattened region has a hole (not shown), through which a bolt or other fastener connects to part of the vehicle. A washer or ring 288 is fixed to the rod, and a ring 290 mounts on housing 210 (FIG. 7). Push-outs 282 and 284 may prevent ring movement to the left. Ring 290 and washer 288 form opposing ledges, and a helical compression spring 292 spans the distance between the ring and the washer and urges rod 264 outward. The length, diameter, spring constant and other properties of the helical spring depend on the application.

The FIG. 7 exemplary embodiment also uses two locking coil springs 296 and 298 around rod 264 and between the bushings 222 and 240. These are the same or similar coil springs described in the discussion of the FIG. 2 embodiment. An end tang 300 and 302 (FIG. 7) of each coil spring seats in corresponding notches 232 and 256 in bushings 222 and 242. An extension (not shown) from each spring's other end attaches to a fitting (also not shown) on handle ring 266 (FIG. 7).

When a user activates the handle and rotates handle ring 266, springs 296 and 298 uncoil slightly. That uncoiling increases each spring's inside diameter to release rod 264. The rod, therefore, can translate into and out of open end 212 of housing 210. When handle ring 266 is in its normal position, coil springs 296 and 298 are not uncoiled and grip rod 264. Under a relatively small axial load to the rod, springs 296 and 298 continue gripping the rod so that the rod does not move longitudinally.

At higher loads, one coil spring 296 or 298 pushes against its bushing 222 or 240 with increased force. The angle of each inside face 230 or 254 cants the spring coils, which, in turn, changes the normally circular coils to ellipsoids. This increases the force that the coil applies to the rod. When the load from the rod is released, the coil springs return to their circular shape.

At still higher axial loads on rod 264, the rod can overcome the forces from the coil spring 296 or 298. In the FIG. 7 embodiment, the second lock for providing additional locking force includes a collet 310 at the right side of the housing. In this exemplary embodiment, cone member 320 forms the collet. The cone member contains the jaw. In this exemplary embodiment, the jaw is a single metal piece with four longitudinal slots to form four jaw members. FIG. 7 shows only two such jaw members 312 and 314 extending forward (to the right in FIG. 7) from a rear face 316. The face of each jaw member facing rod 264 has a ⁹⁄₁₆—20 thread to form teeth 318.

The front (right) side of housing 210 holds cone 320 (FIG. 7). A groove 324 in the housing seats in groove 322 of the cone. The right end 326 of the housing bends over the right side of the cone. This bent-over portion and the intersecting grooves secures the cone in the housing. Elements such as the keeper rings 140 and 142 and the crimp sleeve 144 of the FIG. 6 embodiment could be added to the FIG. 7 embodiment.

The jaw members' outer faces 328 angle approximately 8° from the longitudinal axis. The cone has a cup region 330 that contains part of the jaws. The cup region has an inside-facing face 332 that also is angled at 8° to the longitudinal axis. The rear face 316 of the jaw rests against bushing 244.

The FIG. 2 embodiment used an expansion ring to urge the jaw members outward, out of contact with the rod. The jaw in the FIG. 7 exemplary embodiment is formed from a single piece of material. Therefore, it has it own resiliency that keeps the jaw members away from engaging the rod.

When the jaw is in the position that FIG. 7 shows, the cone provides the jaws sufficient room for the jaw to be out of engagement with the rod. A mechanical fuse in the form of compression ring 336 of soft metal seats in cone member 32 between the jaw members 312 and 314 and a shoulder 338 of the cone member. The compression ring normally holds the jaw to the left in FIG. 7, out of contact with the rod.

If rod 264 is loaded sufficiently to the, right (FIG. 7), coil spring 298 will be unable to stop rod movement. Spring movement pushes on bushing 242, which then pushes on jaw members 312 and 314 and urges them to the right (FIG. 7). As the jaw members' angled faces 328 slides along sloped face 332 of cone 320, the jaw members move inward against rod 264. This movement also collapses compression ring 336. The jaw members then grip rod 264. If the rod continues movement to the right (FIG. 7), the cone forces the jaws against the rod with ever-increasing force until the jaws stops further movement of the rod.

If coil spring 298 fails to impart sufficient force on bushing 244 to move jaw members 312 and 314 to engage rod 264, eventually, the knob 338 on the left end of the rod reaches bushing 220. Because the knob is too large to pass through bore 260 of the bushing, rod movement to the right (FIG. 7) pulls that bushing to the right. That bushing then pushes handle ring 266, which then pushes bushing 244 to the right to move the jaw to the right.

Figure 8:
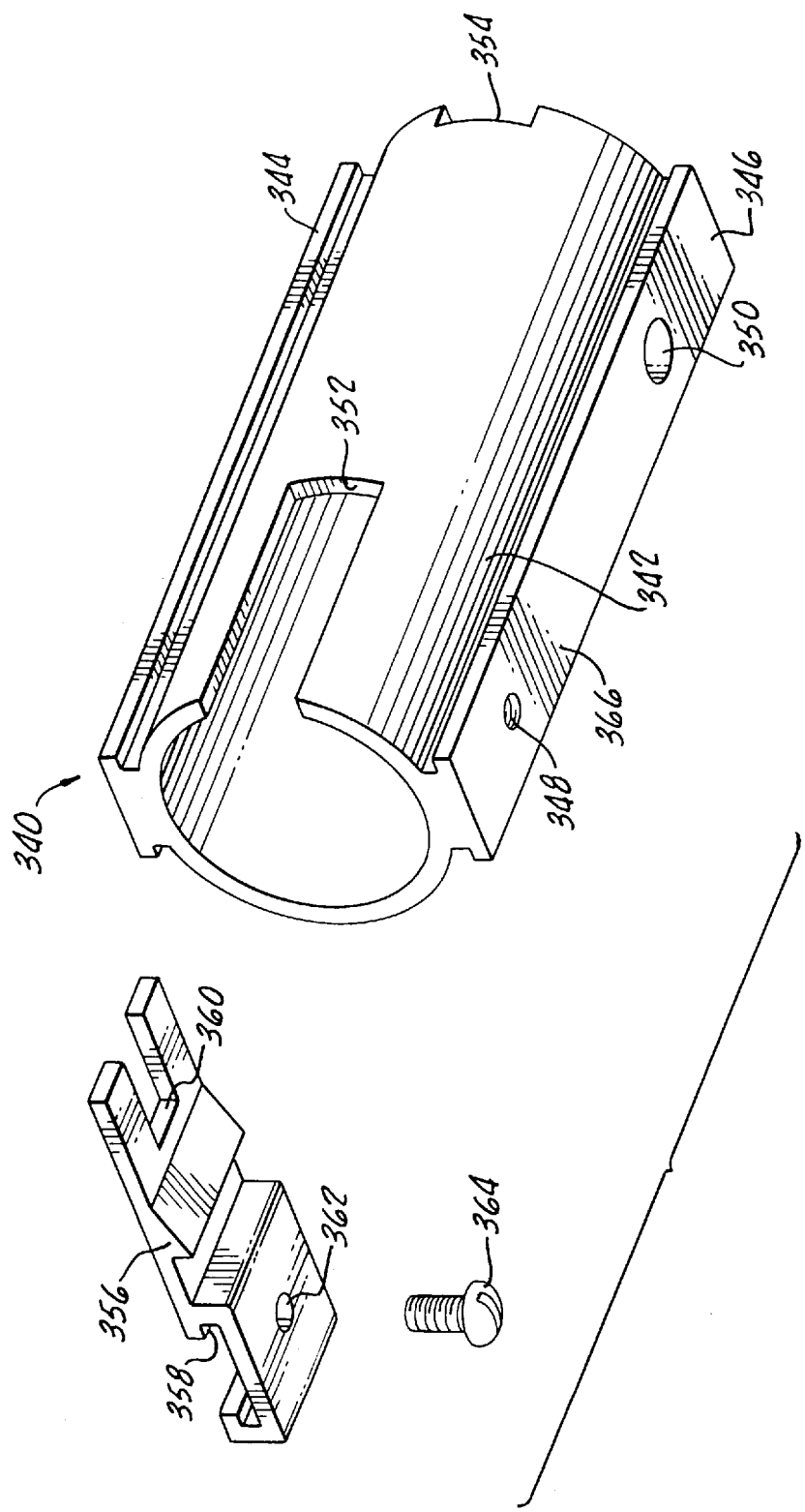
FIG. 8 is a perspective view of the trunnion ring used in the FIG. 7 embodiment.

As FIG. 8 shows, trunnion ring 340 is formed from a cylindrical extrusion 342. That extrusion also forms two, opposing T-shaped longitudinal guides 344 and 346. Guide 344 has two threaded bores 348 and 350, and guide 344 also has two threaded bores, which cannot be seen in FIG. 8. Note that trunnion ring 272 in FIG. 7 has only one threaded bore 274 or 276 on opposite sides of the trunnion ring.

The trunnion ring's cylindrical portion 342 has two notches 352 and 354 (FIG. 8). A cut-our, such as cut-out 282 (FIG. 7) engages notch 354, and retainer ring 278 engages notch 352. Therefore, the trunnion ring cannot rotate on the housing.

Fitting 356 has a slot 358 that allows it to slide and be positioned longitudinally along guides 344 or 346. Fitting 356 also has a notch 360 and a bore 362. Fitting 356 slides to a desired position. That position is designed so that screw or bolt 364 extending through bore 362 can be threaded into bores 348 or 350. Once screw 364 is tightened, fitting 356 is locked to the trunnion ring. Thereafter, a blot or other fastener can attach the entire device through slot 360 on fitting 356. If one desires more adjustability for positioning fittings 356, bore 362 can be threaded and bolt 346 threaded through the bore. By tightening screw 364, the leading end of the screw can push against top surface 366 of the guide. This fixes the fitting's position on the guide.

Numerous modifications and alternate embodiments will occur to those skilled in the art. Therefore, applicant intends that the invention be limited only in terms of the appended claims.

I claim:

1. A linear mechanical lock comprising:
   an elongated housing;
   a rod having a first end extending into the housing and a second end extending out of the housing;
   a first lock comprising a locking spring having an end fixed in the housing and extending around a portion of the rod, the normal inside diameter of the locking spring being less than the outside diameter of the rod so that the locking spring normally grips the rod;
   a moveable handle engaging the locking spring and upon movement of the moveable handle uncoiling the locking spring to increase the locking spring's inside diameter to be greater than the outside diameter of the rod to release the rod;
   a second lock comprising a collet, at least one jaw around the rod within the collet, the jaw having a normal position out of engagement with the rod, the collet having a first region having an inside diameter around the normal position of the jaw to provide sufficient room for the jaw to be out of engagement with the rod; the collet having a second region adjacent the first region and having an inside diameter with insufficient clearance to provide room for the jaw to be out of engagement with the rod;
   a first bushing in the housing and being acted on by the spring, the bushing having an end adjacent to the jaw for pushing the jaw into the second region to force the jaw against the rod.

2. The linear mechanical lock of claim 1, wherein the jaw comprises more than one jaw member, the second lock further comprising a jaw-engaging spring extending between at least two jaw members and biased to urge the jaw members away from the rod.

3. The linear mechanical lock of claim 2, wherein each jaw member has a notch, which is aligned with a corresponding notch on the other jaw members, the jaw-engaging spring comprising a ring in compression seated in the notches of the jaw members and biased to push the jaw members away from the rod.

4. The linear mechanical lock of claim 1 further comprising a compression ring in the housing adjacent the jaw, the compression ring normally blocking movement of the jaw into the second region of the collet, the compression ring being collapsible by the jaw.

5. The linear mechanical lock of claim 1, further comprising a second bushing in the housing and spaced from the first bushing, the first and second bushings having aligned bores with a inside diameter greater than the rod's outside diameter, a knob on one end of the rod located on the other side of the second bushing away from the first bushing, the diameter of the knob being greater than the inside diameter of the bore of the second bushing, the second bushing being pulled toward the first bushing by the knob when the rod moves in the direction of the first bushing relative to the second bushing.

6. The linear mechanical lock of claim 5, further comprising a bushing locating ring fixed in the housing adjacent the second bushing for fixing the longitudinal position of the second bushing in the housing.

7. The linear mechanical lock of claim 6, further comprising at least one indentation on the bushing locating ring, a corresponding indentation on the housing creating a ridge engaging the bushing's indentation.

8. The linear mechanical lock of claim 7, further comprising a keeper ring around the housing in the indentation of the housing and a crimp sleeve around the keeper ring urging the crimp sleeve into the indentation of the housing.

9. The linear mechanical lock of claim 1, further comprising a second bushing in the housing and spaced from the first bushing, the first and second bushings having aligned bores with an inside diameter greater than the rod's outside diameter, the moveable handle having a handle ring extending between the first and second bushings.

10. The linear mechanical lock of claim 1, further comprising a second bushing in the housing and spaced from the first bushing, the first and second bushings having aligned bores with an inside diameter greater than the rod's outside diameter, each bushing having an annular groove, the housing having an annular groove about at least one of the bushings to form an annular ridge extending into the annular groove of the bushing.

11. The linear mechanical lock of claim 1, wherein the collet comprises a cone member secured in the housing.

12. The linear mechanical lock of claim 11, further comprising a trunnion ring around the housing for supporting trunnions for attaching the linear mechanical lock.

13. The linear mechanical lock of claim 12, further comprising a retainer ring around the housing and engaging the trunnion ring.

14. The linear mechanical lock of claim 13, further comprising a second bushing in the housing and spaced from the first bushing, each bushing having an annular groove, the housing having an annular groove about at least one of the bushings to form an annular ridge extending into the annular groove of the bushing, the retainer ring seating in one of the annular grooves of the housing.

15. The linear mechanical lock of claim 14, further comprising a pushout extending radially outward on the housing adjacent the other side of the trunnion ring from the retainer ring and preventing longitudinal movement of the trunnion ring on the housing.

16. The linear mechanical lock of claim 1, wherein the collet comprises a cone member secured in the housing, the cone member having an annular notch, the housing having an annular ridge extending into the annular notch of the cone member.

17. The linear mechanical lock of claim 16, the cone member having an end, the housing having a bent-over portion over the end of the cone member.

18. The linear mechanical lock of claim 1 wherein the jaw comprises more than one jaw member, at least a portion of each jaw member being attached together.

19. The linear mechanical lock of claim 1, further comprising a second bushing in the housing and spaced from the first bushing, each bushing having a notch, the locking spring comprising a pair of coil springs, each coil spring having an end tang that mounts in the notch of one of the bushings.

20. A linear mechanical lock comprising:
an elongated housing having a first, closed end and a second, open end;
a rod having a first end extending into the housing and a second end extending out of the housing, the rod being subjected to tension loading relative to the housing under emergency loading;
a locking spring having an end fixed in the housing and extending around a portion of the rod, the normal inside diameter of the locking spring gripping the rod, the locking spring releasing the rod when the locking spring is uncoiled;
a collet in the housing, at least one jaw adjacent the rod within the collet, the jaw normally out of engagement with the rod, and the collet having first region having an inside diameter around the normal position of the jaw to provide sufficient room for the jaw to be out of engagement with the rod; the collet having a second region closer to the open end of the housing and having an inside diameter with insufficient clearance to provide sufficient room for the jaw to be out of engagement with the rod;
a first bushing in the housing and having one end operably connected to the jaw and the other end operably connected to the locking spring whereby movement of the locking spring pushes the jaw toward the second region of the collet.

21. The linear mechanical lock of claim 20, wherein the jaw comprises more than one jaw member, the lock further comprising a jaw-engaging spring extending between at least two jaw members and biased to urge the jaw members away from the rod.

22. The linear mechanical lock of claim 21, wherein each jaw member has a notch, which is aligned with a corresponding notch on the other jaw members, the jaw-engaging spring comprising a ring in compression seated in the notches of the jaw members and biased to push the jaw members away from the rod.

23. The linear mechanical lock of claim 20, further comprising a compression ring in the housing adjacent the jaw, the compression ring normally blocking movement of the jaw into the second region of the collet, the compression ring being collapsible by the jaw.

24. The linear mechanical lock of claim 20, further comprising a second bushing in the housing and spaced from the first bushing, the first and second bushings having aligned bores with a inside diameter greater than the rod's outside diameter, a knob on one end of the rod located on the other side of the second bushing away from the first bushing, the diameter of the knob being greater than the inside diameter of the bore of the second bushing, the second bushing being pulled toward the first bushing by the knob when the rod moves in the direction of the first bushing relative to the second bushing.

25. The linear mechanical lock of claim 24, further comprising a bushing locating ring fixed in the housing adjacent the second bushing for fixing the longitudinal position of the second bushing in the housing.

26. The linear mechanical lock of claim 25, further comprising at least one indentation on the bushing locating ring, a corresponding indentation on the housing creating a ridge engaging the bushing's indentation.

27. The linear mechanical lock of claim 26, further comprising a keeper ring around the housing in the indentation of the housing and a crimp sleeve around the keeper ring urging the crimp sleeve into the indentation of the housing.

28. The linear mechanical lock of claim 20, further comprising a second bushing in the housing and spaced from the first bushing, the first and second bushings having aligned bores with an inside diameter greater than the rod's outside diameter, the moveable handle having a handle ring extending between and in contact with the first and second bushings.

29. The linear mechanical lock of claim 20, further comprising a second bushing in the housing and spaced from the first bushing, the first and second bushings having aligned bores with an inside diameter greater than the rod's outside diameter, each bushing having an annular groove, the housing having an annular groove about at least one of the bushings to form an annular ridge extending into the annular groove of the bushing.

30. The linear mechanical lock of claim 20, wherein the collet comprises a cone member secured in the housing.

31. The linear mechanical lock of claim 30, further comprising a trunnion ring around the housing for supporting trunnions for attaching the linear mechanical lock.

32. The linear mechanical lock of claim 31, further comprising a retainer ring around the housing and engaging the trunnion ring.

33. The linear mechanical lock of claim 32, further comprising a second bushing in the housing and spaced from the first bushing, each bushing having an annular groove, the housing having an annular groove about at least one of the bushings to form an annular ridge extending into the annular groove of the bushing, the retainer ring seating in one of the annular grooves of the housing.

34. The linear mechanical lock of claim 33, further comprising a pushout extending radially outward on the housing adjacent the other side of the trunnion ring from the retainer ring and preventing longitudinal movement of the trunnion ring on the housing.

35. The linear mechanical lock of claim 20, wherein the collet comprises a cone member secured in the housing, the cone member having an annular notch, the housing having an annular ridge extending into the annular notch of the cone member.

36. The linear mechanical lock of claim 35, the cone member having an end, the housing having a bent-over portion over the end of the cone member.

37. The linear mechanical lock of claim 20 wherein the jaw comprises more than one jaw member, at least a portion of each jaw member being attached together.

38. The linear mechanical lock of claim 20, further comprising a second bushing in the housing and spaced from the first bushing, each bushing having a notch, the locking spring comprising a pair of coil springs, each coil spring having an end tang that mounts in the notch of one of the bushings.

* * * * *